R. A. FISHER.
WHEEL AND FASTENINGS THEREFOR.
APPLICATION FILED MAY 26, 1915.
1,197,362.
Patented Sept. 5, 1916.
3 SHEETS—SHEET 1.
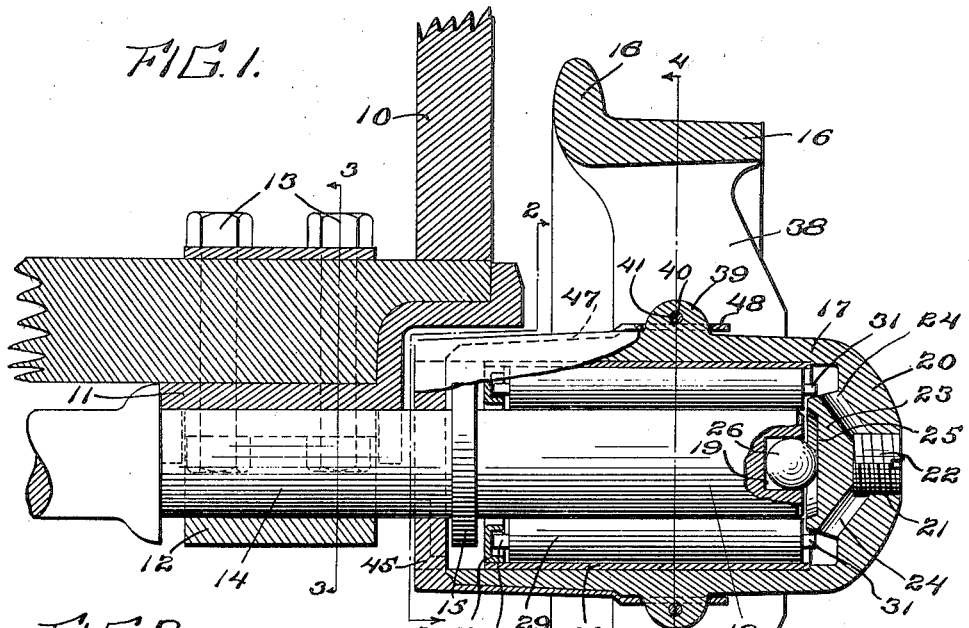
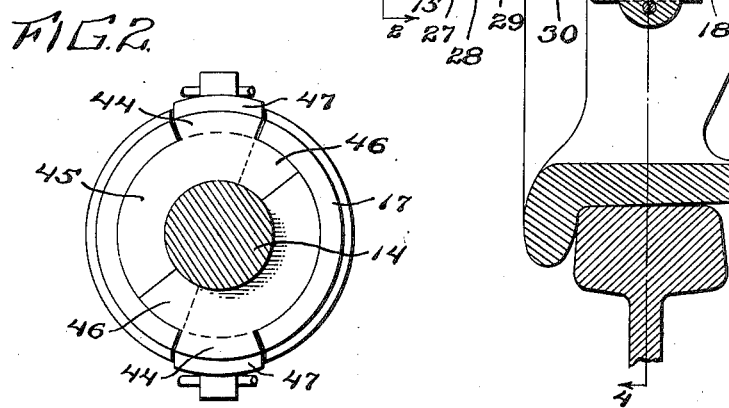
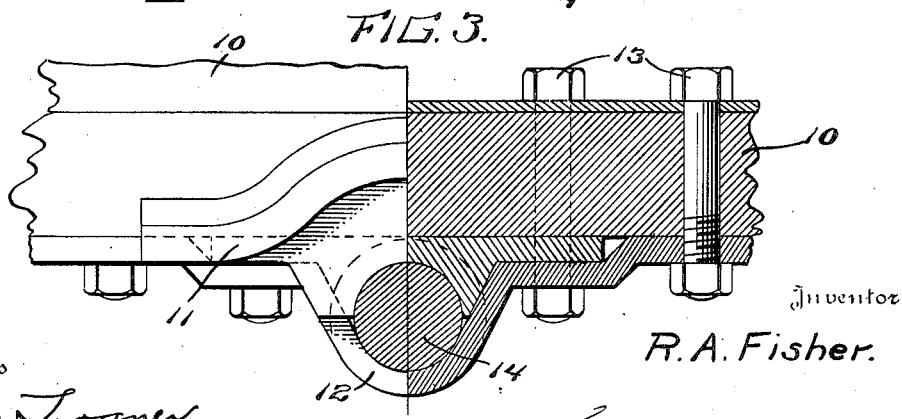
Witness
P. M. Trogner.
Inventor
R. A. Fisher.
By Geo. H. Snyder
Attorney

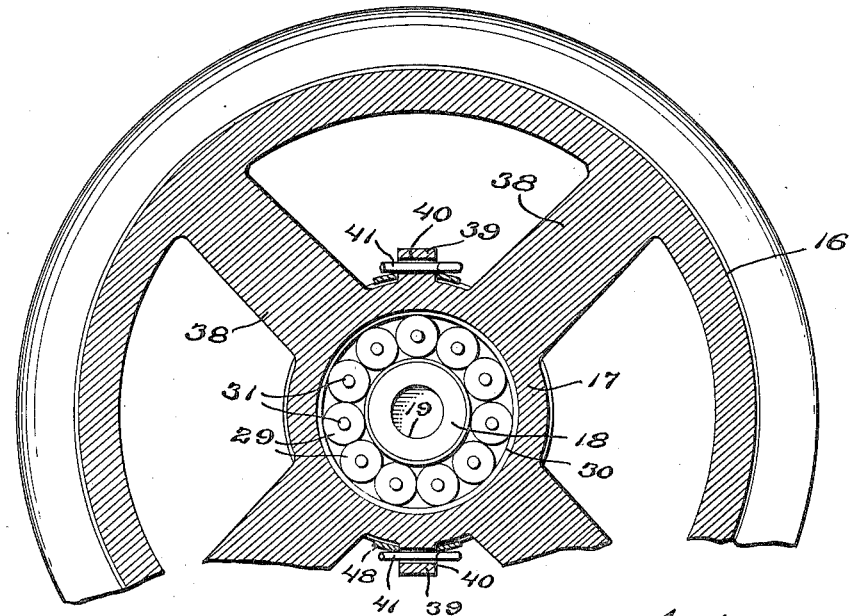
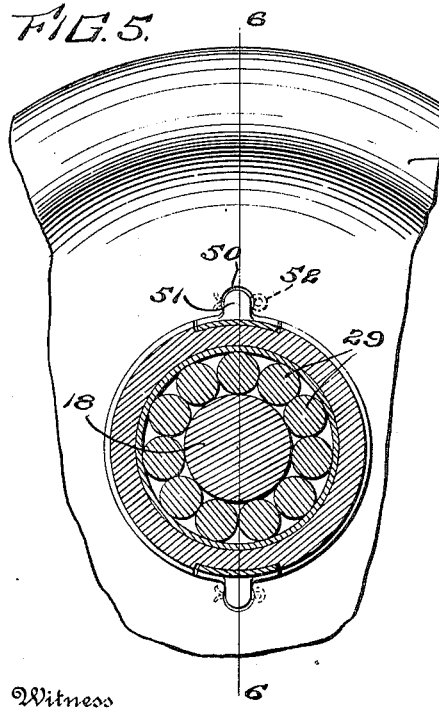
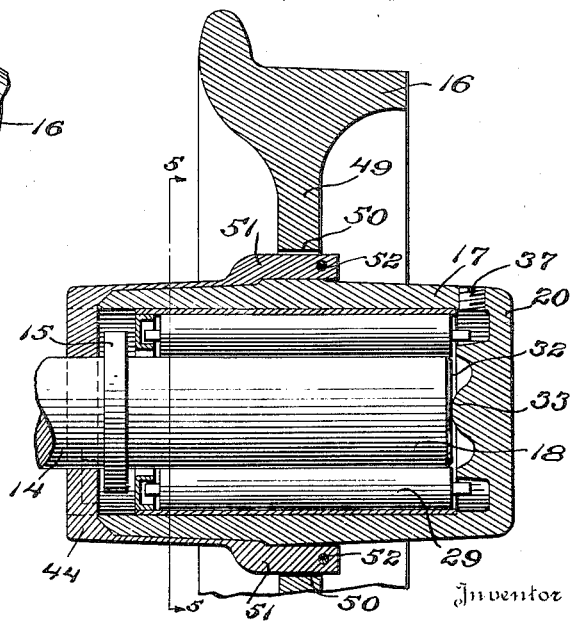

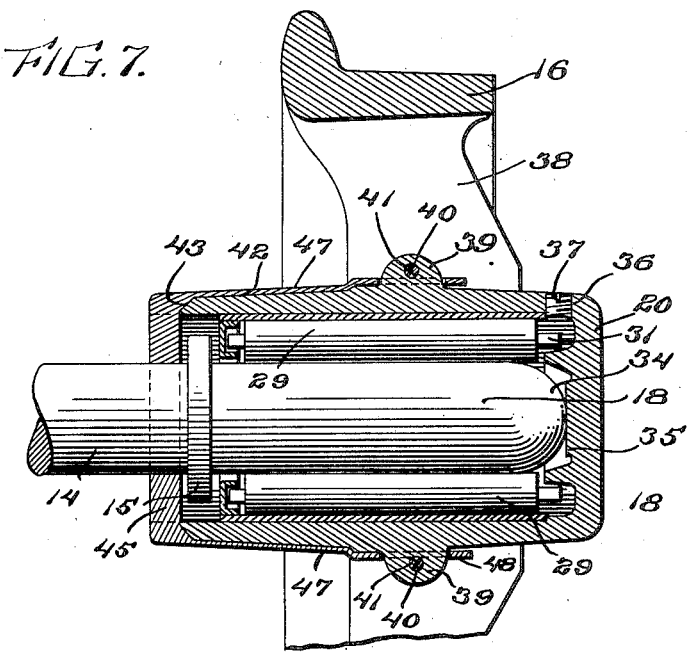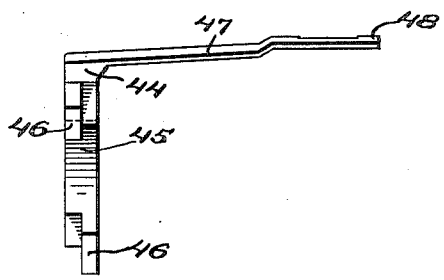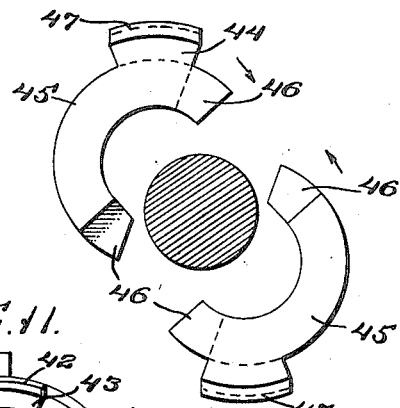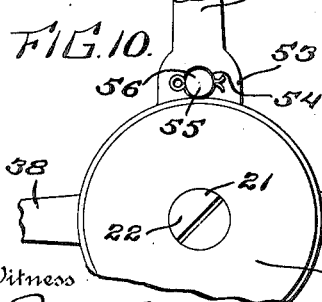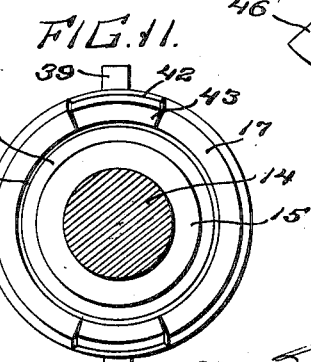

UNITED STATES PATENT OFFICE.

ROY A. FISHER, OF KNOXVILLE, TENNESSEE.

WHEEL AND FASTENINGS THEREFOR.

1,197,362.   Specification of Letters Patent.   Patented Sept. 5, 1916.

Application filed May 26, 1915. Serial No. 30,577.

*To all whom it may concern:*

Be it known that I, ROY A. FISHER, a citizen of the United States, residing at Knoxville, in the county of Knox and State of Tennessee, have invented certain new and useful Improvements in Wheels and Fastenings Therefor, of which the following is a specification.

This invention relates to vehicles and has special reference to wheel construction and mounting of vehicles such as mine cars, industrial railway cars and other cars of like type.

More especially the invention relates to a particular arrangement of vehicle wheel which can be readily mounted on and demounted from the axle journal of a vehicle of the above type, and which will provide a bearing practically dust and oil proof.

The principal object of the invention is to improve and simplify the general construction of devices of this character.

Another object of the invention is to provide an improved bearing for vehicle wheels of this character.

A third object of the invention is to provide improved means for securing the wheel on the axle journal.

With the above and other objects in view, the invention consists in general of certain novel details of construction and combinations of parts hereinafter fully described, illustrated in the accompanying drawings, and specifically claimed.

In the accompanying drawings, like characters of reference indicate like parts in the several views, and Figure 1 is a section through a portion of a car showing one form of the improved wheel applied to its axle, the wheel and axle being shown partly in elevation and partly in section. Fig. 2 is a view on the line 2—2 of Fig. 1 showing the hub only and looking in the direction of the arrows. Fig. 3 is a detail section partly through the stirrup plate and partly showing such plate in elevation, the view being taken on the lines 2—2 and 3—3 in the direction opposite the arrows of the line 2—2. Fig. 4 is a detail view on the line 4—4 of Fig. 1. Fig. 5 is a detail section on the line 5—5 of Fig. 6. Fig. 6 is a section on the line 6—6 of Fig. 5, the last two views showing a modified form of the device. Fig. 7 is a view similar to Fig. 6 showing a second modification of the device. Fig. 8 is a view showing one of the locking segments used in connection with Figs. 1 and 7 in side elevation. Fig. 9 is a detail disassembled view of the locking segments used herewith and showing their relationship to the axle. Fig. 10 is a detail view showing a portion of a fourth modification. Fig 11 is a detail view showing the inner end of the hub used herewith.

In carrying out the objects of the invention and in the present embodiment thereof, there is illustrated a portion of a car body 10 which is provided with the usual clamping stirrups 11 and 12 secured together and to the car body by the bolts 13. Between these stirrups is received an axle 14 which in each instance is provided with a collar 15. In all of the forms herein shown there is provided a wheel having a flanged rim 16 and a hollow hub 17 which surround the journal end 18 of the axle.

In the form shown in Fig. 1 this journal end 18 is provided at its outer extremity with a socket 19 and the outer end of the hub 17 is closed, as illustrated at 20 with the exception of a central screw-threaded opening 21 normally closed by a plug 22. Projecting inward from this end 20 is a frusto-conical boss 23 provided with grease openings 24 leading from the threaded opening 21. This boss is recessed centrally as at 25 for the reception of a ball 26 which is held in the socket 19. At the inner end of the journal 18 is a roller cage 27 arranged to receive the journals 28 of a series of rollers 29 which surround the journal 18 and in the hub is provided a wearing sleeve 30 running on these rollers. The outer end of each roller 29 is provided with a journal 31 which rests on the outer portion of the frusto-conical boss 23 so that the rollers are kept in proper position. These rollers, boss and cage, as well as the closed hub end, frusto-conical projection and sleeve are provided in each instance but in place of the ball 26 of Fig. 1 the journal 18 has its outer end flattened in the form shown in Fig. 6, as at 32 and against this flattened end 32 bears a segmental spherical projection 33 extending inward from the closed end 20. In like manner the form shown in Fig. 7 varies slightly from that shown in Fig. 1 in the provision of a rounded end 34 on the journal 18 which bears against a flat surface 35 on the closed end 20. In both of these forms the introduction of grease is effected through a lateral opening 36, closed by a screw plug 37 except when it is desired to introduce the grease.

In the forms shown in Figs. 1 and 7, the wheel is provided with a series of spokes 38 and intermediate certain of these spokes is formed a radial boss 39 having a cotter pin receiving opening 40 therein for the reception of a cotter pin 41. In these forms also the surface of the hub is provided with oppositely disposed grooves 42 terminating at their ends in notches 43. Received in the notches 43 are lugs 44 which project upward from segmental locking plates 45 having coöperating rabbeted ends 46 so arranged that when the two locking plates are in position on the inner side of the flange 15 they will lock together closely around the axle 14 and thus prevent any dust getting into the interior of the hub or any of the grease from leaking out along the axle. Projecting outward from these lugs 44 are arms 47 which lie in the grooves 42 for the greater portion of their length, but are offset to provide slotted ends 48 which fit over the lugs 39 and are held thereon by the cotter pins 41.

In the form shown in Fig. 6, a webbed wheel is provided having a web 49 through which are suitable openings 50 which take the place of the lugs 39 and receive offset ends 51 on the locking members, these ends being prevented from retraction through the openings by cotter pins 52.

In the form shown in Fig. 10 the lugs 39 are dispensed with but the spokes of the wheel are enlarged as at 53 and provided with suitable openings 54 for the reception of the rounded and offset ends 55 of the locking members, these ends being prevented from retraction by cotter pins 56.

It will be obvious from the foregoing construction that whenever it is desired to remove a wheel it is merely necessary to withdraw the cotter pins and unlock the retaining members, moving them to the position shown in Fig. 9. When this is done the wheel may be simply slipped right off the axle, the cage and rollers moving from the axle with the wheel. A new wheel may quickly be placed in position. When it is desired to remove the rollers from the hub, the wheel is first removed and then, by using a suitable implement, the cage may be withdrawn together with the lining or wearing sleeve whereupon all of the rollers will be loosened and can easily be removed or replaced. It will be obvious that the assembling of the device involves simply the opposite of the action in disassembling, which has just been described.

It is to be especially noted that the axle end and end of the hub are of hardened material, this being required more especially in the forms other than that employing a ball, although advisable also in this form. For instance, the axle end may be case-hardened or other tempered steel, while the portion of the hub forming the outer closure may have its inner face chilled hard.

What is claimed as new is:—

1. The combination with an axle provided with a journal having a collar at its inner end, of a hub, and segmental non-yieldable interlocking retaining members wholly supported by the hub and arranged to embrace the axle inside the collar, the members being provided with means for releasable attachment to the wheel, and having overlapping ends to constitute the members an annulus when positioned.

2. The combination with an axle provided with a journal having a collar at its inner end; of a wheel rotatable on the journal and having a hub provided with substantially radial portions; and retaining members arranged to engage over the collar and detachably attached to the radial portions of the wheel.

3. The combination with an axle provided with a journal having a collar at its inner end; of a wheel having a hub rotatable on the journal and having substantially radial portions projecting from said hub, and retaining members arranged to engage over the collar on the axle and provided with portions interfitting with and releasably engaged to said radial portions.

4. The combination with an axle provided with a journal having a collar at its inner end; of a wheel having a hub rotatable on the journal and having substantially radial portions projecting from said hub, and segmental and interlocking retaining members arranged to engage over the collar on the axle and provided with portions interfitting with and releasably engaged to said radial portions.

5. The combination with an axle provided with a journal having a collar at its inner end; of a wheel having a hub rotatable on the journal and having substantially radial portions projecting from said hub, the wheel further having retaining member receiving recesses alined with the radial portions, and retaining members arranged to engage over the collar on the axle and provided with portions interfitting with and releasably engaged to said radial portions.

6. The combination with an axle provided with a journal having a collar at its inner end; of a wheel having a hub rotatable on the journal and having substantially radial portions projecting from said hub, and segmental and interlocking retaining members arranged to engage over the collar on the axle and provided with portions interfitting with and releasably engaged to said radial portions, the wheel further having retaining member receiving recesses alined with the radial portions.

7. The combination with an axle provided with a journal having a collar at its inner end; of a wheel having a hub rotatable on the journal and having substantially radial portions projecting from said hub, the wheel further having retaining member receiving recesses alined with the radial portions, and retaining members arranged to engage over the collar on the axle and provided with portions interfitting with and releasably engaged to said radial portions, said retaining members being provided with portions seated in the recesses.

8. The combination with an axle provided with a journal having a collar at its inner end; of a wheel having a hub rotatable on the journal and having substantially radial portions projecting from said hub, and segmental and interlocking retaining members arranged to engage over the collar on the axle and provided with portions interfitting with and releasably engaged to said radial portions, the wheel further having retaining member receiving recesses alined with the radial portions, said retaining members being provided with portions seated in the recesses.

In testimony whereof I affix my signature in presence of two witnesses.

ROY A. FISHER.

Witnesses.
F. M. PIERCE,
S. O. STEWART.